United States Patent Office 2,770,624
Patented Nov. 13, 1956

2,770,624

PREPARATION OF NEW THIAMINE SALTS

Isamu Utsumi, Yoshida, Sakyo-ku, Kyoto-shi, and Kiyoshi Harada, Otsu-shi, Shiga-ken, Japan, assignors to Gohei Tanabe & Co., Ltd., Osaka, Japan, a corporation of Japan No Drawing. Application June 15, 1954,
Serial No. 437,008

11 Claims. (Cl. 260—256.6)

This invention is concerned with a new and useful thiamine higher molecular alkylsulphates and the process for their production. More particularly, it relates to process for the production of thiamine-mono- and di-higher molecular alkylsulphates by reacting the acid salts of thiamine base with metal or ammonium salts of higher molecular alcohol sulphuric acid esters.

It is a well-known fact that when salts of thiamine, of which thiamine hydrochloride is most widely used, are used for injection a pain is felt in the part of the body because of its acidity.

Accordingly, some attempts to reduce the pain of the injections were made by adjusting the pH near neutrality or by adding special medicines to them with the result that the injections became unstable and colouring or precipitation was produced. On the other hand, when such solutions were injected in the body much inconvenience was felt because there was a defect for the old salts of thiamine to stay a short time in the body and excreted proportionally rapidly.

The old salts of thiamine above described are liable to decomposition by moisture and reduce the contents even in various forms of tablets and powder under the influence of other medicines added to and external conditions.

Moreover, they come to lose the special physiological efficiency by a degenerative change in quality when they are added to foods for an enrichment and stored over a long period of time.

The object of the present invention is to provide a novel process for preparing thiamine higher molecular alkylsulphates on an economical and large scale production.

Another object of the present invention is to offer new thiamine higher molecular alkylsulphates, which are suitable for preparing injections, tablets, powders and for enrichment of foods in which they do not lose the physiological efficiency on storage over a long period of time.

The present invention comprises an novel process for preparing thiamine higher molecular alkylsulphates by reacting the acid salts of thiamine base with metal or ammonium sulphuric acid esters of higher molecular alcohols in the presence of water.

By the process of this invention thiamine-mono- and di-higher molecular alkylsulphates are obtained. Thiamine-mono-higher molecular alkylsulphates are prepared by counteracting 1 mol of mono-acid-salts of thiamine base with 1 mol of metal or ammonium salts of higher molecular alcohol sulphuric acid esters. Thiamine-di-higher molecular alkylsulphates are prepared by counteracting 1 mol of di-acid-salts of thiamine base with 2 mols of metal or ammonium salts of higher molecular alcohol sulphuric acid esters.

The reaction occurs even under heating, but room temperature is most suitable.

The acid salts of thiamine base used as raw materials are generally inorganic acid salts, preferably thiamine hydrochloride because of its availability.

The metal and ammonium salts of sulphuric acid esters of higher molecular alcohols contain saturated alcohols and unsaturated alcohols.

The higher molecular alcohols contain more than 8 carbon atoms.

These compounds are known as wetting agents, namely sodium laurylsulphate, sodium cetylsulphate and sodium stearylsulphate.

Generally the thiamine higher molecular alkylsulphates obtained by the process of this invention are hardly soluble in water, easily soluble in alcohols and glycols and soluble in acetone, chloroform and benzene under heating.

That the combination of thiamine base with sulphuric acid esters of higher molecular alcohols is strong has been demonstrated by the absorption spectrum of infra-red rays.

The anions of the acid salts of thiamine base used as starting materials have not been found in the thiamine higher molecular alkylsulphates.

As a result of our investigation, we have discovered several novel compounds, namely: thiamine-mono-laurylsulphate, thiamine-mono-myristylsulphate, thiamine-mono-cetylsulphate, thiamine-di-laurylsulphate, thiamine-di-myristylsulphate, thiamine-di-cetylsulphate and thiamine-di-stearylsulphates.

These thiamine-di-higher molecular alkylsulphates have probably 1 mol of water of crystallisation.

The melting points and solubilities of the compounds obtained by the process of the present invention are tabulated below:

| Compounds obtained | M. P., °C. | Solubility Percent at 15° C. | Solubility Percent at 30° C. |
| --- | --- | --- | --- |
| Thiamine-mono-laurylsulphate | 103–105 | 0.15 | 0.17 |
| Thiamine-mono-myristylsulphate | 106–108 | 0.013 | 0.018 |
| Thiamine-mono-cetylsulphate | 110–113 | 0.0085 | 0.0098 |
| Thiamine-di-laurylsulphate | 81–85 | 0.024 | 0.028 |
| Thiamine-di-myristylsulphate | 87–89 | 0.0025 | 0.0029 |
| Thiamine-di-cetylsulphate | 89–90 | 0.00025 | 0.0003 |
| Thiamine-di-stearylsulphate | 90–93 | 0.00005 | 0.0008 |

As these compounds themselves have also the ability to reduce the surface tension, an aqueous suspension for injection can be prepared with these compounds.

Painless and stable aqueous solutions and oily solutions for injection can easily be prepared when thiamine higher molecular alkylsulphates are used with wetting agents at the same time.

These injections are controlled not to be absorbed rapidly into the body and the supply of the compounds into the body is continued over a long period of time.

On the other hand, when these compounds are used for the enrichment the natural flavor and taste of the food and drink are never spoiled because these compounds have neither the strange odor nor the bitter taste of thiamine base or its old salts.

As above described these thiamine higher molecular alkylsulphates have new and useful effects free from all the defects indigenous to the old salts of thiamine base which hitherto have been generally used.

The present invention is of highly practical value because preparations produced by the process of this invention are widely applicable to medicines and food and drink.

The method is simple and the process proceeds smoothly.

In order to make it more clear the nature of the present invention, specific examples illustrating the method of the invention will hereinafter be described.

It should be understood, however, that the illustration is solely by way of examples and is intended neither to delineate the scope of the invention nor limit the ambit of the appended claims.

*Example 1*

31 gm. of thiamine-mono-hydrochloride is dissolved in 100 cc. of water. To this solution is added with stirring at room temperature a saturated solution of 28 gm. of sodium laurylsulphate.

Upon cooling, after the reaction has been completed, the crystals of thiamine-mono-laurylsulphate that precipitate out are separated by filtration. These crystals are recrystallized from dilute acetone. Colourless crystalline powder of thiamine-mono-laurylsulphate melting at 103–105° C. is obtained. The yield is 27 gm.

The flame reaction of sodium and chlorine with regard to this compound is negative.

The thiochrom reaction and the color reaction with sulphanilic acid are positive intensively.

It has been proved that thiamine base combines with laurylsulphuric acid ester at the rate of 1 mol: 1 mol respectively because the percentage of thiamine base contained in this compound was found 49.5% by quantitative analysis.

The solubility in water is 0.15% and 0.17% at 15° C. and 30° C. respectively.

*Example 2*

Thiamine-mono-laurylsulphate melting at 103–105° C. identical to the product prepared in Example 1, was obtained by the same process as Example 1 using thiamine-mono-hydrobromide in place of thiamine-mono-hydrochloride.

*Example 3*

31 gm. of thiamine-mono-hydrochloride is dissolved in 100 cc. of water. To this solution is added with stirring at room temperature a saturated solution of 31 gm. of sodium myristylsulphate. Upon cooling, after the reaction has been completed, the crystals of thiamine-mono-myristylsulphate that precipitate out are separated by filtration.

These crystals are recrystallized from dilute acetone. Colourless crystalline powder of thiamine-mono-myristylsulphate melting at 106–108° C. is obtained. The yield is 29 gm.

The flame reaction of sodium and chlorine is negative.

It has been proved that thiamine base combined with myristylsulphuric ester at the rate of 1 mol:1 mol respectively because the percentage of thiamine base contained in this compound was found 47.4% by quantitative analysis.

The solubility in water is 0.013% and 0.018% at 15° C. and 30° C. respectively.

*Example 4*

31 gm. of thiamine-mono-hydrochloride is dissolved in 100 cc. of water. To this solution is added with stirring at room temperature a saturated solution of 34 gm. of sodium cetylsulphate. Upon cooling, after the reaction has been completed, the crystals of thiamine-mono-cetylsulphate that precipitate out are separated by filtration.

These crystals are recrystallized from alcohol.

Colourless crystalline powder of thiamine-mono-cetylsulphate melting at 110–113° C. is obtained.

The yield is 30 gm.

The flame reaction of sodium and chlorine is negative.

The solubility in water is 0.0085% and 0.0098% at 15° C. and 30° C. respectively.

*Example 5*

34 gm. of thiamine chloride hydrochloride is dissolved in 100 cc. of water. To this solution is added with stirring at room temperature a saturated solution of 57 gm. of sodium laurylsulphate. Upon cooling with ice, after the reaction has been completed, the crystals of thiamine-di-laurylsulphate that precipitate out are separated by filtration.

These crystals are recrystallized from acetone. Colourless crystalline powder of thiamine-di-laurylsulphate melting at 81–85° C. is obtained. The yield is 68 gm. The flame reaction of sodium and chlorine is negative. The thiochrom reaction and the colour reaction with sulfanilic acid are positive intensively.

It has been proved that 1 mol of thiamine base combines with 2 mols of laurylalcohol sulphuric acid ester because the percentage of thiamine base contained in this compound was found 33.3% from the values of the quantitative analysis by the formalin-azo-method and the elementary analysis.

*Example 6*

Thiamine-di-laurylsulphate melting at 81–85° C. identical to the product prepared in Example 5, was obtained by the same process as Example 5 using thiamine bromide hydrobromide in place of thiamine chloride hydrochloride.

*Example 7*

34 gm. of thiamine chloride hydrochloride is dissolved in 100 cc. of water. To this solution is added with stirring at room temperature a saturated solution of 63 gm. of sodium myristylsulphate. Upon cooling with ice, after the reaction has been completed, the crystals of thiamine-di-myristylsulphate that precipitate out are separated by filtration. These crystals are recrystallized from acetone. Colourless crystalline powder of thiamine-di-myristylsulphate melting at 87–89° C. is obtained. The yield is 75 gm.

The flame reaction of chlorine is negative. The thiochrom reaction and the colour reaction with sulphanilic acid is positive intensively. It has been proved that 1 mol of thiamine base combines with 2 mols of myristylalcohol sulphuric ester because the percentage of thiamine base contained in this compound was found 31.1% from the values of the quantitative and the elementary analysis.

*Example 8*

34 gm. of thiamine chloride hydrochloride is dissolved in 100 cc. of water. To this solution is added a saturated aqueous solution of 50° C. containing 68 gm. of sodium cetylsulphate with stirring at room temperature. Upon cooling with ice, after the reaction has been completed, thiamine-di-cetylsulphate that precipitates out is separated by filtration, followed by recrystallization from dilute acetone. The thiamine di-cetylsulphate so obtained is a colourless crystalline powder, melting at 89–90° C. The yield is 82 gm.

The flame reaction of sodium and chlorine with regard to this compound is negative. It was illustrated that 1 mol of thiamine base combines with 2 mols of cetylalcohol sulphuric acid ester because the percentage of thiamine base contained in this compound was found 29.2% from the values of quantitative and elementary analysis.

The terms and expressions which we have employed are used as terms of description and not of limitation, and we have no intention, in the use of such terms and expressions, of excluding any equivalents of the features shown and described or portions thereof, but recognize that various modifications are possible within the scope of the invention claimed.

What is claimed is:
1. Thiamine-di-laurylsulphate.
2. Thiamine-di-myristylsulphate.
3. Thiamine-di-cetylsulphate.
4. Thiamine-di-stearylsulphate.
5. A thiamine di-higher molecular straight chain alkyl sulfate, wherein the alkyl sulfate moiety is a member selected from the class consisting of lauryl, myristyl, cetyl and stearyl sulfates.

6. The novel process for preparing thiamine di-higher molecular straight chain alkyl sulphates, which comprises treating a thiamine di-acid salt with a member selected from the class consisting of alkali-metal and ammonium salts of lauryl, myristyl, cetyl and stearyl sulfates.

7. The novel process as defined by claim 6, wherein the 2 mols of the alkali-metal and ammonium salts are employed for each mol of the thiamine di-acid salt.

8. The novel process as defined by claim 6, wherein the thiamine di-acid salt is the di-hydrohalide salt.

9. The novel process as defined by claim 6, wherein the thiamine di-acid salt is the di-hydrobromide salt.

10. The novel process as defined by claim 6, wherein the thiamine di-acid salt is the di-hydrochloride salt.

11. The novel process as defined by claim 6, wherein the two reactants are brought together in the presence of water.

References Cited in the file of this patent

UNITED STATES PATENTS 2,468,930   Huber et al. _____ May 3, 1949

FOREIGN PATENTS 831,247   Germany _____ Feb. 11, 1952

OTHER REFERENCES

Huber: J. Am. Chem. Soc., 68–188 (1946).